(12) United States Patent
Menheere et al.

(10) Patent No.: US 9,003,638 B2
(45) Date of Patent: Apr. 14, 2015

(54) METHOD OF ASSEMBLING AN ELECTROMECHANICAL DEVICE IN A GAS-TURBINE ENGINE

(71) Applicant: Pratt & Whitney Canada Corp., Longueuil (CA)

(72) Inventors: David Menheere, Georgetown (CA); Andreas Eleftheriou, Woodbridge (CA); Richard Kostka, Bolton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 13/792,804

(22) Filed: Mar. 11, 2013

(65) Prior Publication Data

US 2014/0250680 A1 Sep. 11, 2014

(51) Int. Cl.
H02K 15/02 (2006.01)

(52) U.S. Cl.
CPC ..................................... H02K 15/02 (2013.01)

(58) Field of Classification Search
USPC .......... 29/596–598, 732–736; 290/52, 43, 47, 290/54; 310/52, 58–59, 216.022; 415/110–111, 229; 60/786–788, 778, 60/226.1
See application file for complete search history.

(56) References Cited

U.S. PATENT DOCUMENTS

| | | | |
|---|---|---|---|
| 4,062,186 A | 12/1977 | Snow et al. | |
| 5,253,470 A | 10/1993 | Newton | |
| 5,301,500 A | 4/1994 | Hines | |
| 5,309,029 A | 5/1994 | Gregory et al. | |
| 5,349,814 A | 9/1994 | Ciokajlo et al. | |
| 5,911,679 A | 6/1999 | Farrell et al. | |
| 6,467,725 B1 | 10/2002 | Coles et al. | |
| 6,619,908 B2 * | 9/2003 | Bruno et al. | 415/1 |
| 6,732,529 B2 | 5/2004 | Anderson | |
| 6,851,267 B2 | 2/2005 | Bruno et al. | |
| 6,900,553 B2 | 5/2005 | Gozdawa | |
| 7,013,651 B2 | 3/2006 | Bruno et al. | |
| 7,146,707 B2 * | 12/2006 | Tornquist et al. | 29/598 |
| 7,216,475 B2 | 5/2007 | Johnson | |
| 7,418,821 B2 | 9/2008 | Butt | |
| 7,500,365 B2 | 3/2009 | Suciu et al. | |
| 7,514,810 B2 | 4/2009 | Kern et al. | |
| 7,552,591 B2 | 6/2009 | Bart et al. | |
| 7,728,447 B2 | 6/2010 | Becquerelle et al. | |
| 7,805,947 B2 | 10/2010 | Moulebhar | |
| 7,882,691 B2 | 2/2011 | Lemmers, Jr. et al. | |
| 7,997,085 B2 | 8/2011 | Moniz et al. | |
| 8,015,828 B2 | 9/2011 | Moniz et al. | |
| 8,074,555 B1 | 12/2011 | Sullivan et al. | |
| 8,113,005 B2 | 2/2012 | Götz et al. | |
| 8,191,352 B2 | 6/2012 | Schilling | |
| 8,616,849 B2 * | 12/2013 | Menheere et al. | 416/193 A |
| 8,667,773 B2 | 3/2014 | Silkowski | |
| 2008/0265580 A1 | 10/2008 | Sharp | |
| 2010/0107650 A1 | 5/2010 | Ress, Jr. et al. | |
| 2011/0289936 A1 | 12/2011 | Suciu et al. | |
| 2012/0117981 A1 | 5/2012 | Suciu et al. | |
| 2012/0117982 A1 | 5/2012 | Suciu et al. | |

* cited by examiner

Primary Examiner — Minh Trinh
(74) Attorney, Agent, or Firm — Norton Rose Fulbright Canada

(57) ABSTRACT

A method of assembling an electromechanical device in a gas-turbine engine, including mounting a rotor of the device on a rotor support, securing a stator of the device to a stator support, coupling the rotor support to the stator support such that said rotor is rotatable about said stator, securing the device to a bearing support, securing a bearing assembly on the low pressure shaft, coupling the device to the low pressure shaft by installing the bearing support over the bearing assembly, and drivingly engaging the rotor support to the high pressure shaft.

11 Claims, 5 Drawing Sheets

METHOD OF ASSEMBLING AN ELECTROMECHANICAL DEVICE IN A GAS-TURBINE ENGINE

TECHNICAL FIELD

The application relates generally to gas turbine engines and, more particularly, to electromechanical devices in such an engine.

BACKGROUND OF THE ART

A known method of installing an internal starter/generator in a gas turbine engine includes attaching the rotating component of the internal starter/generator cantilevered from the forward end of the high pressure shaft of the engine. This usually results in additional rotating weight on the high pressure shaft and as such may have an adverse effect on the dynamics of the high pressure shaft. As such, the addition of an internal starter/generator to an engine not originally designed to accept one may necessitate a redesign of the high pressure shaft to support the additional loads associated with the starter/generator, displacement of bearing supports to accommodate the starter/generator which may require a redesign of the low pressure shaft, and/or changes in the low pressure shaft support structure requiring retesting the engine for blade-off and bird-ingestion, any of which may result in substantial development costs.

SUMMARY

In one aspect, there is provided a method of assembling an electromechanical device in a gas-turbine engine having independently rotatable and concentric low pressure and high pressure shafts, the low pressure shaft having a portion extending beyond the high pressure shaft supported by at least one bearing assembly, the method comprising: mounting a rotor of the device on a rotor support; securing a stator of the device to a stator support; coupling the rotor support to the stator support such that said rotor is rotatable about said stator; securing the device to a bearing support; securing a selected one of the at least one bearing assembly on the low pressure shaft; coupling the device to the low pressure shaft by installing the bearing support over the selected bearing assembly; and drivingly engaging the rotor support to the high pressure shaft.

In another aspect, there is provided a method of assembling a starter/generator in a gas-turbine engine, the method comprising: coupling a rotor and a stator of the starter/generator such that the rotor is rotatable with respect to the stator to drive the rotor when the starter/generator is electrically powered and to produce electrical power when the rotor is rotated; securing the stator to a bearing support; coupling the starter/generator device to a low pressure shaft of the engine by installing the bearing support over a bearing assembly secured to an end of the low pressure shaft; inserting the low pressure shaft through a high pressure shaft of the engine with the end of the low pressure shaft protruding therefrom and positioning the starter/generator in proximity of an end of the high pressure shaft; and drivingly engaging the rotor to the high pressure shaft.

DESCRIPTION OF THE DRAWINGS

Reference is now made to the accompanying figures in which.

DETAILED DESCRIPTION

Figure 1:
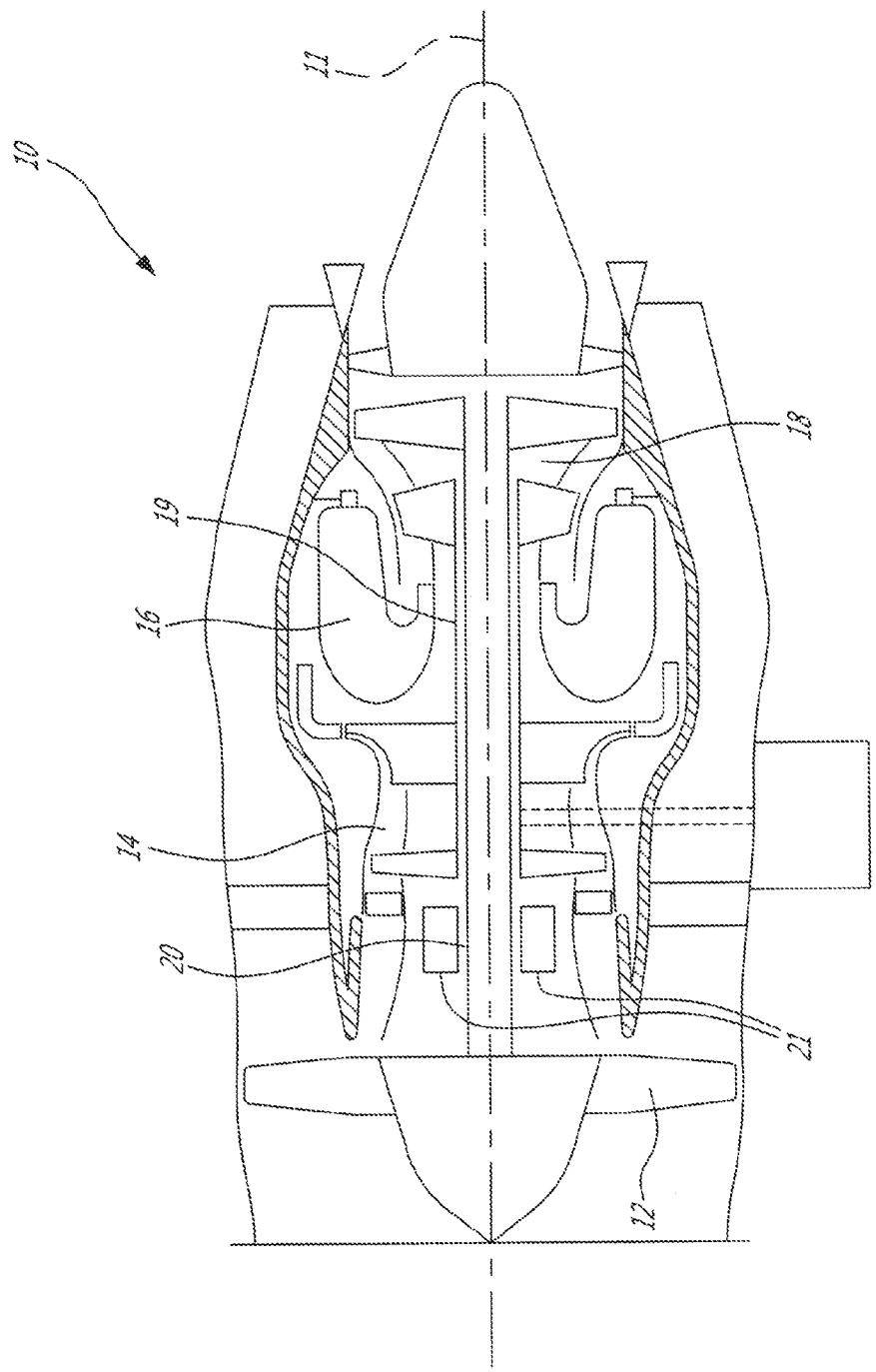
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. A high pressure shaft 19 drivingly interconnects high pressure rotors of the compressor and turbine sections 14, 18. A low pressure shaft 20 rotatable independently from the high pressure shaft 19 drivingly interconnects the fan 12 and low pressure rotor(s) of the turbine section 18. Although not shown, the low pressure shaft 20 may also support additional low pressure rotor(s) of the compressor section 14. The low pressure shaft 20 is hollow and extends through the high pressure shaft 19 beyond each end thereof. Although the engine 10 is illustrated as a turbofan engine, alternately the engine may be any other adequate type of gas turbine engine, such as for example a turboprop or a turboshaft engine.

Figure 2:
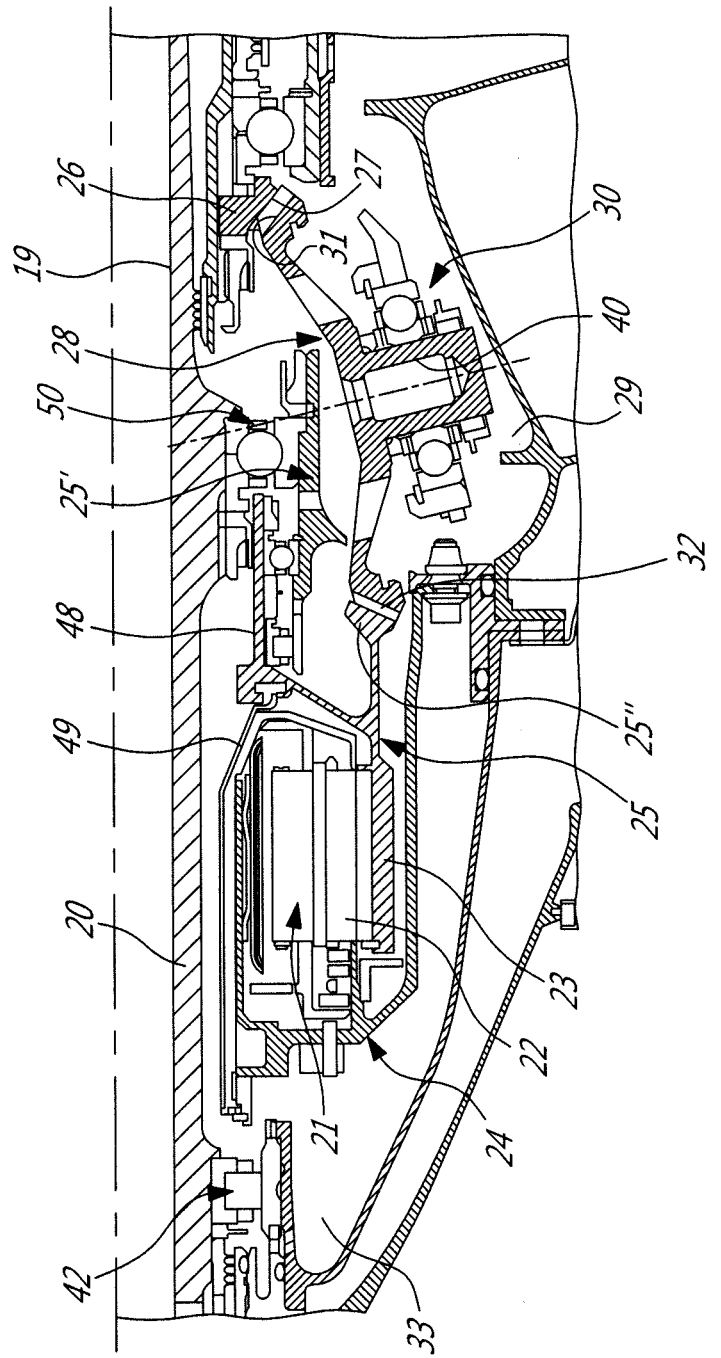
FIG. 2 is a schematic cross-sectional side view illustrating a portion of a gas-turbine engine and an internal electromechanical device in accordance with a particular embodiment.

Referring to FIG. 2, the portion of the low pressure shaft 20 protruding from the high pressure shaft 19 is supported by first and second spaced apart bearing assemblies 42, 50 each received in a respective beating cavity 33, 29, the first bearing assembly 42 being located closer to the end of the low pressure shaft 20, and as such further from the high pressure shaft 19, than the second bearing assembly 50. An electromechanical device 21 is described herein and is installed between the two spaced apart bearing assemblies 50, 42 about the low pressure shaft 20 to be driven by the high pressure shaft 19. In a particular embodiment, the electromechanical device is a starter/generator. The electromechanical device 21 is an internal device as it is received radially inwardly with respect to the flowpath of the engine. In a particular embodiment, the internal electromechanical device 21 is received within one or more bearing housings.

Referring to FIG. 2, there is shown the manner in which the device 21 is supported about the low pressure shaft 20. As herein shown, the device 21 is provided with a stator 22 and a rotational rotor 23 which is rotatable about the stator 22. The stator 22 is housed in a stationary stator support 24 which is secured to a bearing support 25' of the second bearing assembly 50. The rotor 23 is secured to an arm of a rotor support 25.

A ring gear 25" is secured to an arm of the rotor support 25. The device gear 25" has a series of circumferential teeth 32. A ring gear 26 is further secured about the end of the high pressure shaft 19 and rotated therewith. The shaft gear 26 has a series of bevelled gear teeth 27 thereabout.

In order to transfer the drive between the shaft gear 26 and the device gear 25" to produce electricity by the device 21 when in a generator mode and/or to use the device 21 to drive the high pressure shaft 19 when in a starter mode, these gears have to be coupled. In the embodiment shown, this is achieved by mounting a coupling idle gear 28 in the bearing cavity 29 associated with the second bearing assembly 50. The coupling idle gear 28 has circumferential teeth gear 31 which are in toothed engagement with the bevel gear teeth 27 of the shaft gear 26 and the bevel gear teeth 32 of the device gear 25". As herein shown, the coupling idle gear 28 has a hub 40 which is configured for rotational displacement in a support assembly 30 secured to stationary components of bearing support 25'. When the high pressure shaft 19 is rotated, it will cause rotation of the coupling idle gear 28 which in turn rotates the device gear 25" thereby displacing the rotor support 25 and the rotor 23 about the stator 22 of the device to produce electricity. Additionally or alternately, when the rotor 23 is rotated as the device 21 is powered, the device gear 25" rotates the idle gear 28 which in turn rotates the high pressure shaft 19 through the shaft gear 26. It is pointed out that the rotating components of the device 21 are fully supported independent of other rotating engine components by the same structure as the bearing support 25' associated with the second bearing assembly 50. In a particular embodiment, replacement of an external starter/generator driven by a power shaft by the device 21 driven by the intermediate coupling idle gear 28 supported in the bearing cavity 29 allows for the bearing support 25' to remain at the same location so that the shaft dynamics of the low pressure shaft 20 may be maintained, and so that the dynamics of the high pressure shaft 19 may be unaffected by the device installation.

In summary, the method of operating the device 21 generally comprises the steps of mounting the electromechanical device 21 about the low pressure shaft 20 of a gas turbine engine with the rotor 23 of the device 21 mounted on the rotor support 25, having the device gear 25" secured thereto, and supported about the low pressure shaft 20 by the bearing support 25'. The method further comprises securing the shaft gear 26 about the high pressure shaft 19. Still further, the method comprises coupling the shaft gear 26 to the device gear 25" through the coupling idle gear 28 rotationally supported by a stationary gear support immovably mounted in the bearing cavity 29.

It can be appreciated that the ratio between the number of the bevelled gear teeth of the shaft gear 26, the coupling idle gear 28 and the device gear 25" determines the rotational speed of the rotor 23 in relation to the high pressure shaft speed. Accordingly, the rotor drive speed can be stepped up or down.

Figure 3:
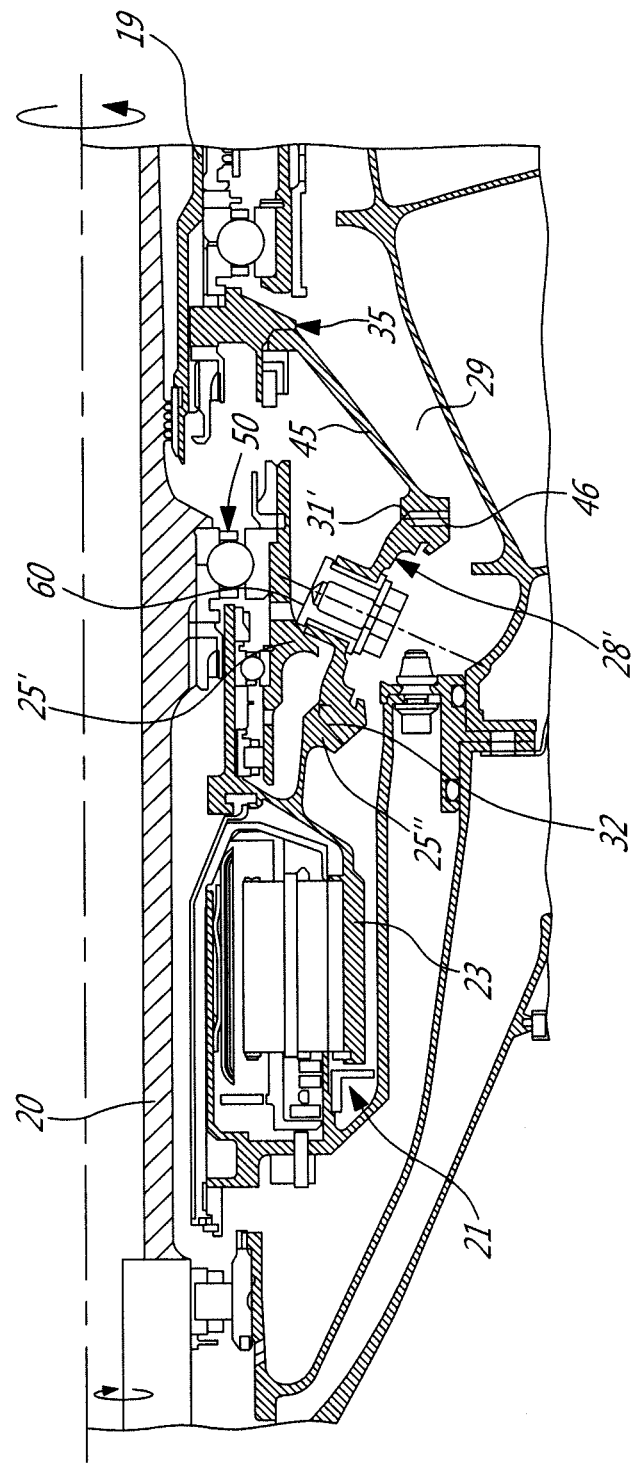
FIG. 3 is a schematic cross-sectional view illustrating a portion of a gas-turbine engine and an internal electromechanical device in accordance with another particular embodiment.

Referring to FIG. 3, there is shown a further embodiment of a gear coupling ratio between the high pressure shaft 19 and the device gear 25", allowing for a step-up speed relationship. As herein shown, a shaft ring gear 35 has a conical section 45 rearwardly projecting in the bearing cavity 29. Circumferential teeth 46 are disposed about the larger outer periphery of the conical section 45 and are in toothed engagement with the teeth 31' of a smaller coupling idle gear 28'. The teeth 31' of the coupling idle gear 28' are also in toothed engagement with the teeth 32 of the device gear 25". Accordingly, it can be seen that by modifying the size of the shaft gears 26, 35 and the coupling idle gear 28, 28' that the relative rotational speed of the rotor 23 with respect to that of the high pressure shaft 19 can be modified.

Figure 4:
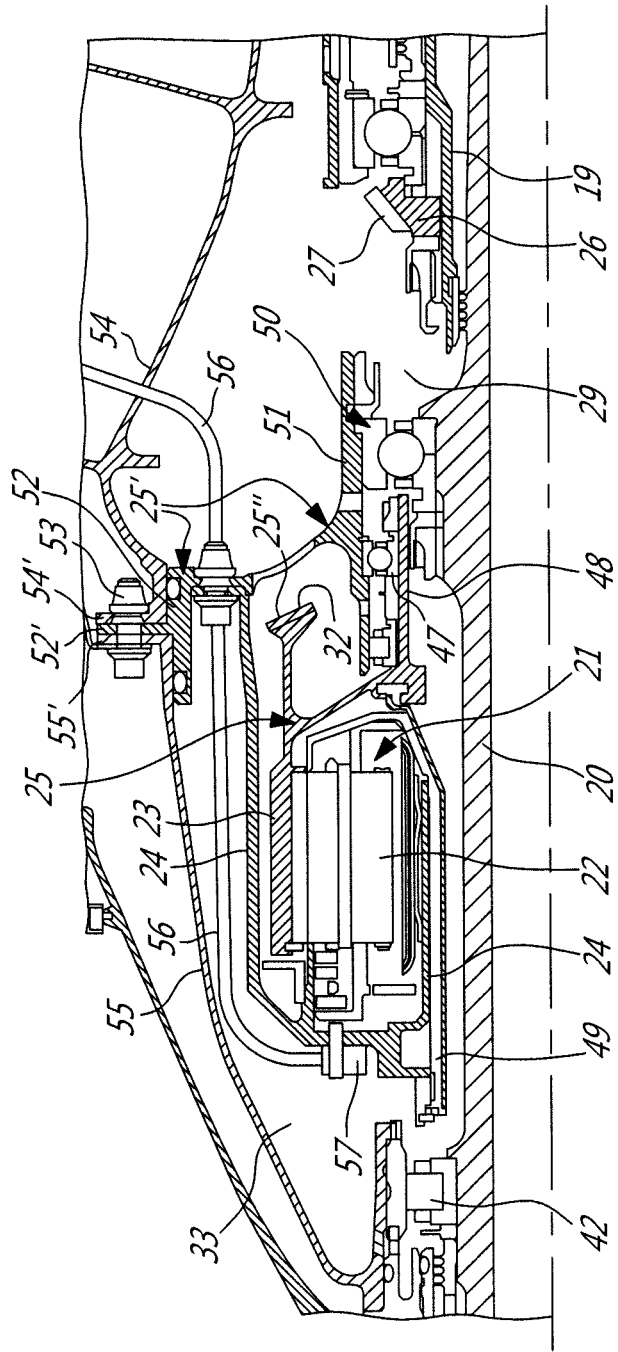
FIG. 4 is a schematic cross-sectional view illustrating a portion of a gas-turbine engine and a step in the assembly of an internal electromechanical device therein, in accordance with a particular embodiment.
Figure 5:
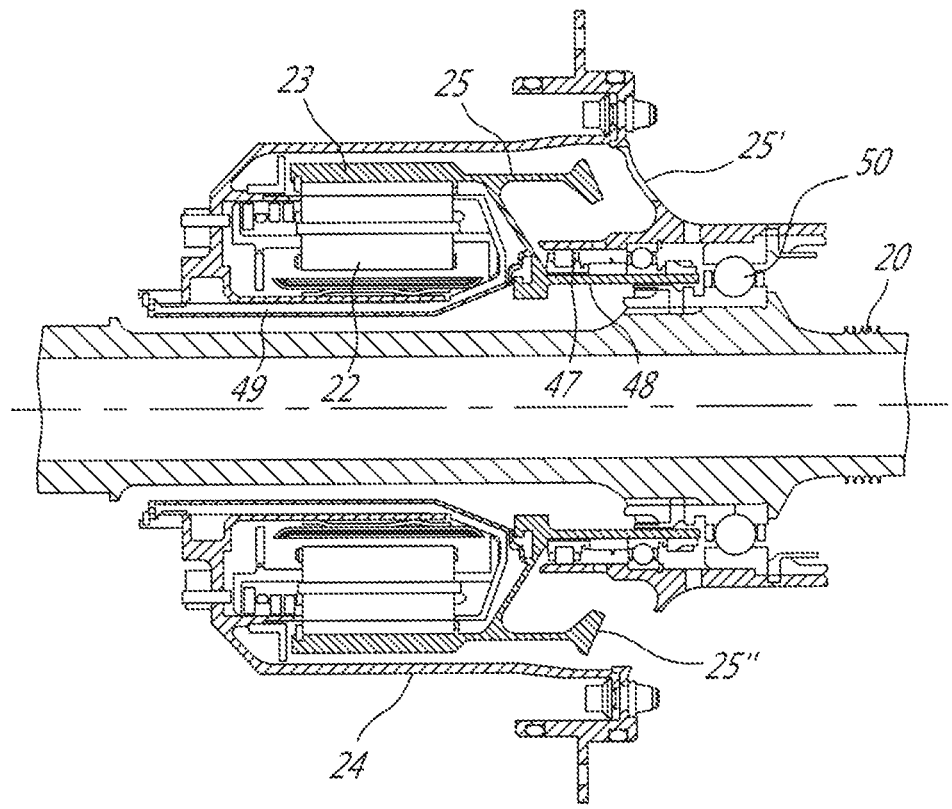
FIG. 5 is a schematic sectional side view showing a low pressure shaft assembly, illustrating another step in the assembly of the starter generator in accordance with a particular embodiment.

Referring now to FIGS. 4 and 5, there will be described the method of assembling the device 21 in a gas turbine engine and about the low pressure shaft 20 thereof and between bearing assemblies 42, 50.

The method comprises mounting the rotational rotor 23 of the device 21 on the rotor support 25 which is provided with the device gear 25". The bearings 47 of the rotor support 25 are installed on a support sleeve 48 of the rotor support 25. The stator 22 of the device 21 is secured to the stator support 24. The rotor support 25 of the rotor 23 is coupled to a stator housing 49 to rotate about the stator housing with the stator 22 immovably supported therein. The stator support 24 is then secured to the bearing support 25' of the second bearing assembly 50. The second bearing assembly 50 is then secured, herein by press-fitting it on the low pressure shaft 20. The stator support 24 and the rotor support 25 of the rotor 23 coupled for rotation thereabout are then installed over the bearing assembly 50 to form a low pressure shaft assembly as shown in FIG. 5.

As shown in FIG. 4, the bearing support 25' is provided with an annular flange 51 which is fitted over the second bearing assembly 50 and the bearings 47 supported on the support sleeve 48 of the rotor support 25 are retained in position by a ledge on the surface of the flange 51. This secures the bearings and the support sleeve 48 captive but rotatable on its bearing support. Accordingly, the internal stator generator with its connection to the bearing support 25' is now mounted on the low pressure shaft 20, as shown in FIG. 5.

As shown in FIG. 4, the bearing support 25' is also provided with a connecting portion 52 having a flange 52' which is immovably connected to a flange 54' of the bearing housing 54 by a series of bolts 53 thereabout. The bearing housing 55 of the first bearing assembly 42 is also provided with a flange 55' which is interconnectable with the flanges 52' and 54' of the second bearing housing 54 and the connecting portion 52 for connection therewith. This is done by different bolts after the flanges 52' and 54' are interconnected.

Before the first bearing housing 55 is secured over the device 21, the power cable 56 are routed from inside the second bearing housing 54 through the bearing support 25' and over the stator support 24. The power cable 56 is then secured to cable connectors 57 mounted exteriorly on the front end of the stator support 24. The device gear 25" may be coupled to the coupling idle gear 28 during the mounting of the bearing support 25' over the bearings or thereafter. The method therefore also driveably engaging the high pressure shaft 19 and the rotor 23 of the device 21 and in the particular embodiment shown this includes by securing the shaft gear 26 to the high pressure shaft 19, rotationally installing the idle gear 28 on a support in the second bearing cavity 29 or attached to a gear support 60 securable or integrally formed on the outer face of the bearing support 25' of the second bearing assembly 50, and meshing the idle gear 28 with the shaft gear 26 and the device gear 25", as shown in FIG. 3.

In a particular embodiment the idle gear 28 is engaged with the device gear 25" and assembled with the low pressure shaft assembly (including the device 21 and the bearing support 25'). The shaft gear 26 is assembled to the high pressure shaft 19 before the installation of the low pressure shaft assembly to the second bearing housing 54. Assembly of the low pressure shaft assembly to the second bearing housing 54 engages the teeth of the idle gear 28 and of the shaft gear 26.

In an alternate embodiment, the idle gear 28, 28' may be replaced by any other adequate type of member allowing a driving engagement, including but not limited to a lay shaft.

The above description is meant to be exemplary only, and one skilled in the art will recognize that changes may be made to the embodiments described without departing from the scope of the invention disclosed. For example, by modifying the gear ratios, a desired rotor drive speed can be obtained and modified. Still other modifications which fall within the scope of the present invention will be apparent to those skilled in the art, in light of a review of this disclosure, and such modifications are intended to fall within the appended claims.

The invention claimed is:

1. A method of assembling an electromechanical device in a gas-turbine engine having independently rotatable and concentric low pressure and high pressure shafts, the low pressure shaft having a portion extending beyond the high pressure shaft supported by at least one bearing assembly, the method comprising:
   mounting a rotor of the device on a rotor support;
   securing a stator of the device to a stator support;
   coupling the rotor support to the stator support such that said rotor is rotatable about said stator;
   securing the device to a bearing support;
   securing a selected one of the at least one bearing assembly on the low pressure shaft;
   coupling the device to the low pressure shaft by installing the bearing support over the selected bearing assembly; and
   drivingly engaging the rotor support to the high pressure shaft.

2. The method as defined in claim 1, wherein the rotor support includes a device gear, and drivingly engaging the rotor support to the high pressure shaft includes meshing an idle gear with the device gear and with a gear extending from the high pressure shaft.

3. The method as defined in claim 2, wherein the idle gear is rotationally secured to the bearing support and received in a bearing housing of the selected bearing assembly.

4. The method as defined in claim 1, wherein coupling the rotor support to the stator support includes installing bearings on a support sleeve portion of the rotor support and coupling the rotor support to the stator support through the bearings.

5. The method as defined in claim 1, wherein the at least one bearing assembly includes first and second bearing assemblies with the second bearing assembly being located closer to the high pressure shaft than the first bearing assembly when the low pressure shaft and high pressure shaft are assembled in the engine, and wherein the device is secured to the bearing support of the second bearing assembly, the second bearing assembly is secured on the low pressure shaft, and the device is coupled to the low pressure shaft by installing the bearing support over the second bearing assembly.

6. The method as defined in claim 5, further comprising enclosing the device in a housing of the first bearing assembly to secure the device and the low pressure shaft to the engine.

7. The method as defined in claim 6, wherein enclosing the device in the housing of the first bearing assembly includes immovably securing the housing of the first bearing assembly to the bearing support and to a housing of the second bearing assembly.

8. The method as defined in claim 1, wherein after coupling the device to the low pressure shaft, power cables of the device are routed over the stator support and secured to cable connectors secured to the stator support.

9. The method as defined in claim 1, wherein installing the bearing support over the selected bearing assembly includes positioning an annular flange of the bearing support about the selected bearing assembly with bearings on the support portion of the rotor support retained captive for rotation about the annular flange, and immovably securing a connecting portion of the bearing support to a housing of the selected bearing assembly.

10. The method as defined in claim 1, wherein the selected bearing assembly is press-fitted on the low pressure shaft.

11. The method as defined in claim 1, wherein the low pressure shaft is engaged in the high pressure shaft after the device is coupled to the low pressure shaft.

* * * * *